United States Patent Office 3,544,422
Patented Dec. 1, 1970

3,544,422
PREHYDROLYSIS TREATMENT FOR CHEMICAL
CELLULOSE PRODUCTION
Byron J. L. Huff, Memphis, Tenn., and Karsten A.
Zachariasen, Perry, Fla., assignors to The Buckeye Cellulose Corporation, Cincinnati, Ohio, a corporation of Ohio
No Drawing. Continuation-in-part of application Ser. No.
555,700, June 7, 1966. This application June 10, 1969,
Ser. No. 832,032
Int. Cl. D21c 3/00
U.S. Cl. 162—82          8 Claims

ABSTRACT OF THE DISCLOSURE

An oxidative prehydrolysis procedure for use in the preparation of chemical cellulose wherein oxidative prehydrolysis is conducted at a temperature of about 300° F. to about 350° F. for a period of about 10 minutes to about 40 minutes in initial wetting contact with substantially chlorine free acidic aqueous solutions of chlorine dioxide or chemical equivalents thereof having a pH of about 2 to about 6 and containing about 0.2% to about 15% on a bone dry wood chip basis measured as available chlorine, of chlorine dioxide or chemical equivalents thereof. Cellulosic materials accorded to the prehydrolysis are thereafter treated by conventional digestive and bleaching procedures to result in chemical cellulose of substantially increased purity, as measured by increased alpha cellulose content together with decreased pentosan content and decreased Swedish cold caustic solubility. Further, and more importantly, the filterability of viscose prepared from the oxidatively prehydrolyzed chemical cellulose is substantially increased without conventional surfactant addition.

BACKGROUND OF THE INVENTION

This application is a continuation-in-part of copending application, Ser. No. 555,700, filed June 7, 1966 and now abandoned. This invention relates to the preparation of chemical cellulose for use as a raw material in the production of cellulose derivatives and viscose rayon. More particularly, the invention is concerned with the provision of a novel and improved prehydrolysis, wherein an oxidative delignifying agent is initially present, to be used prior to the sulfate digestion of wood chips.

Specifically, the invention comprises an oxidative prehydrolysis wherein wood chips are oxidatively prehydrolyzed in initial wetting contact with a substantially chlorine free acidic aqueous solution of chlorine dioxide or a chemical equivalent thereof prior to sulfate digestion and later bleaching steps to produce chemical cellulose. The resulting chemical cellulose converts into viscose exhibiting a substantially increased viscose filterability, even without addition of the surfactant conventionally added to chemical cellulose for the purpose of increasing viscose filterability.

In the production of chemical cellulose from wood by the sulfate process, wood chips are conventionally given a prehydrolysis in the presence of steam, hot water, certain mineral acids including sulfuric and hydrochloric acids, or combinations of these prior to sulfate digestion and continued purification of the cellulose through multiple bleaching stages. Such prehydrolysis processes are disclosed in U.S. 2,878,118, issued to Linwood N. Rogers et al. on Mar. 17, 1959 and in U.S. 3,013,933, issued to Ben T. Briggs on Dec. 19, 1961. Chemical celluloses intended for use in the viscose rayon industry and for the production of cellulose derivatives can also have a surfactant incorporated therein to increase filterability. U.S. 2,805,169, issued to Reid Logan Mitchell on Sept. 3, 1957 and U.S. 2,931,734, issued to Donald F. Durso on Apr. 5, 1960, disclose surfactants for use in improving the viscose filterability of viscose produced from the product chemical cellulose.

Applicants have unexpectedly discovered that the purity of chemical cellulose and the filterability of viscose produced therefrom can be improved by subjecting wood chips to an oxidative prehydrolysis which comprises treating the wood chips in intial wetting contact with substantially chlorine free acidic aqueous solutions of chlorine dioxide or chemical equivalents thereof. Such a prehydrolysis is advantageous in that the purity of the resulting chemical cellulose is substantially increased as measured by increased alpha cellulose content together with decreased pentosan content and decreased Swedish cold caustic solubility. More importantly, the filterability of viscose prepared under a variety of viscose processing conditions from the resulting chemical cellulose is substantially increased over that of viscoses prepared from comparable chemical celluloses accorded a conventional steam-water prehydrolysis during their manufacture. The increase in filterability is achieved without the conventional addition of surfactants for filtration improvement.

This increase in filterability is surprising, because prehydrolyzed sulfate pulps normally have a relatively narrow range of suitable viscose processing conditions which result in optimum viscose filterability. Surfactants are commonly added to chemical cellulose prepared by prehydrolysis sulfate processes to improve their ultimate viscose filterability and to render the ultimate viscose filterability less sensitive to non-ideal conditions in the viscose process. The achievement of increased viscose filterability without surfactant addition avoids both the considerable cost of the surfactants and the introduction of extraneous materials, which can have deleterious side effects, into the chemical cellulose.

It is, therefore, an object of this invention to provide a novel oxidative prehydrolysis for use in the manufacture of chemical cellulose.

A further object is to provide an oxidative prehydrolysis which results in a chemical cellulose which can be converted into viscose exhibiting a substantially improved filterability over viscose prepared from comparable chemical celluloses using conventional prehydrolysis treatments in their manufacture.

Another object of the present invention is to provide an oxidative prehydrolysis which, when effected prior to the conventional sulfate digestion used in the manufacture of chemical cellulose, results in a chemical cellulose product of substantially increased purity.

Still another object of this invention is to provide a novel and unexpectedly effective oxidative prehydrolysis for use prior to the digestion step in the sulfate process whereby the quality of the resulting chemical cellulose and the ultimate rayon yield therefrom are improved.

The foregoing objects are achieved by the present invention which is directed to an oxidative prehydrolysis wherein wood chips are prehydrolyzed while in initial wetting contact with an oxidative delignifying agent prior to sulfate digestion and to the bleaching steps conventionally used in the manufacture of high purity chemical cellulose. Substantially chlorine free acidic aqueous solutions of chlorine dioxide or chemical equivalents thereof, for example acidified aqueous solutions of sodium chlorite, magnesium chlorite and potassium chlorite, have been found to be particularly effective oxidative delignifying agents for use in practicing the invention. The substantially chlorine free acidic aqueous solutions of chlorine dioxide can be placed in initial operative contact with the wood chips by spraying them on the wood chips as they are loaded into a digester or other vessel suitable for prehydrolysis. The initial operative contact can also be achieved by circulating and recirculating the substantially chlorine free acidic aqueous solutions of chlorine dioxide through the wood chips in a prehydrolysis vessel, by soaking the wood chips in the acidic aqueous solution in a prehydrolysis vessel, or by combinations or equivalents of these methods. The oxidative prehydrolysis can either be effected while the wood chips are submerged in the acidified aqueous solution or the wood chips can be accorded prehydrolysis subsequent to draining the acidic aqueous solution from the prehydrolysis vessel. In any case, the wood chips are wet with substantially chlorine free acidified aqueous chlorine dioxide solution during prehydrolysis.

The oxidative prehydrolysis can be conveniently carried out by loading wood chips into a digester and adding thereto about 4 to about 10, preferably about 5 times, the bone dry wood chip weight of a substantially chlorine free acidic aqueous solution containing about 0.2% to about 15%, preferably about 1%, of chlorine dioxide on a bone dry wood chip weight basis measured as available chlorine. The acidic aqueous solution is added in a manner to effectively contact and wet the individual wood chips in the digester. The amount of chlorine dioxide stated is that which is retained in contact with the wood chips during oxidative prehydrolysis. If the acidic aqueous solution is drained from the wood chips, the quantity and strength of the acidic aqueous solution is adjusted to result in such retention during oxidative prehydrolysis of the stated amount of chlorine dioxide.

The pH of the acidic aqueous solution can be about 2 to about 6, adjusted with organic or mineral acids, for example sulfuric acid or acetic acid if necessary, and the wood chips can be in initial contact with the acidic aqueous solution over a period of about 10 to about 70 minutes at temperatures ranging from about 60° F. to about 180° F., prior to oxidative prehydrolysis in the presence of the acidic aqueous solutions. Alternatively, oxidative prehydrolysis can be carried out immediately after adding the wood chips and acidic aqueous solution to the digester.

A typical oxidative prehydrolysis, in which the acidic aqueous solutions of this invention are employed, is carried out by introducing steam into a closed digester containing the initially contacted wood chips while regulating the digester pressure to raise the temperature to about 300° F. to about 350° F., preferably about 340° F. in about 45 minutes. The temperature is then held at about 300° F. to about 350° F., preferably about 340° F. for about 10 minutes to about 40 minutes, preferably about 25 minutes and the digester is thereafter vented and drained, prior to sulfate digestion.

The excess acidic aqueous solution of substantially chlorine free chlorine dioxide can also be drained from the wood chips prior to oxidative prehydrolysis, since the initial soaking, spraying or circulation insures the presence of effective amounts of the acidic aqueous solutions on and in the wood chips.

The preferred procedure for effecting the instant oxidative prehydrolysis is accomplished by first and initially circulating and recirculating about 5 times the bone dry wood chip weight of an acidic aqueous solution of substantially chlorine free chlorine dioxide through a digester containing wood chips for a period of about 15 to about 20 minutes at a temperature of about 70° F. and then proceeding with the oxidative prehydrolysis after draining the free acidic aqueous solution of substantially chlorine free chlorine dioxide from the wood chips. The acidic aqueous solution of substantially chlorine free chlorine dioxide remaining with the wood chips after drainage contains about 1% of chlorine dioxide measured on a bone dry wood chip weight basis as available chlorine. In this preferred procedure, the acidic aqueous chlorine dioxide solution is adjusted to a pH of about 4 with sulfuric acid.

Although the stated temperatures and times are preferred, it is not to be inferred that they are the only ones resulting in the disclosed improvement in the resulting chemical cellulose. Indeed, it is only essential that wood chips be wet with substantially chlorine free chlorine dioxide or chemical equivalents thereof in the disclosed amounts in acidic aqueous solution during oxidative prehydrolysis prior to sulfate digestion to obtain an improved chemical cellulose product.

As stated above, it is essential that the wood chips be in initial contact with the acidic aqueous solution containing substantially chlorine free chlorine dioxide or its chemical equivalent during oxidative prehydrolysis. The necessary initial contact can be achieved in a variety of ways. Although applicants have found the above described procedure of recirculation and drainage prior to oxidative prehydrolysis preferable, the improved prehydrolysis can be carried out by soaking the wood chips in the acidic aqueous solution and proceeding with oxidative prehydrolysis without draining, or by spraying the solution on the wood chips prior to prehydrolysis. Applicants have described the invention in terms of the use of acidic aqueous solutions of substantially chlorine free chlorine dioxide, but any reagent capable of supplying substantially chlorine free chlorine dioxide in the disclosed pH range will be found useful. For example, and as stated above, the necessary substantially chlorine free chlorine dioxide in the acidic aqueous solution or chemical equivalents thereof can also be obtained from an acidic aqueous solution of either sodium chlorite, magnesium chlorite or potassium chlorite.

A person skilled in the art will also be aware that an acidic aqueous solution of chlorine dioxide will also contain chloride, chlorate and chlorite ions in shifting equilibrium percentages, depending upon such factors as the pH and temperature of the solution as well as the consistency and cleanliness of the wood chips with which the solution is placed in contact. The chloride, chlorate and chlorite ion equilibrium will also be affected by the liquor to wood chip weight ratio and the percentage of chlorine dioxide in the original liquor prior to contact with the wood chips.

The relative improvement in filterability and chemical cellulose purity disclosed herein will be realized when the instant oxidative prehydrolysis improvement is followed by any conventional sulfate digestion and bleaching procedure. Applicants have, however, used the following digesting and bleaching procedure in evaluating their novel oxidative prehydrolysis improvement because the use of the standardized digesting and bleaching procedure enabled them to isolate the effect of the improvement.

Applicants digested the oxidatively prehydrolyzed wood chips with sulfate liquor containing a total of 21.5% active alkali on the basis of the bone dry weight of the wood chips. The sulfate digestion liquor weighed 3.1 times the bone dry weight of the wood chips in digestion, and the sulfate digestion liquor contained sodium hydroxide, sodium sulfide and sodium carbonate in a respective weight ratio of 70:20:10, when all the chemicals present were expressed at $Na_2O$ in the conventional nomenclature of the sulfate process. A maximum digestion temperature of 340° F. was obtained over a period of 50 minutes by recirculating the sulfate liquor, and the maximum temperature was maintained for an additional 50 minute period to complete digestion.

After digestion, the pulp resulting from digesting the wood chips was blown from the digester, washed and screened. The screened pulp was subjected to a bleaching sequence comprised of the successive conventional steps of chlorination, hot caustic extraction, hypochlorite bleaching, hot caustic extraction, chlorine dioxide purification, and acid souring prior to washing and drying the chemical cellulose product.

The testing procedures used to obtain the results reported in the examples below are in universal use throughout the industry. The available chlorine determination is a convenient method of determining the amount of active reagent present and is made by pipetting a 25 ml. aliquot sample of the acidic aqueous solution used in the prehydrolysis into 250 ml. Erlemeyer flask containing about 25 ml. of water. The contents of the flask are then titrated with 0.1 N sodium thiosulfate to the disappearance of blue color, using starch indicator near the end point, after adding 10 ml. of aqueous solution containing 20% potassium iodide by weight and 10 ml. of 20% acetic acid. The available chlorine is then calculated stoichemetrically from the titrated amount of 0.1 N sodium thiosulfate.

The alpha cellulose values of chemical cellulose samples as determined throughout the industry are based on empirical procedures. The procedure used to determine the values reported in the examples below is one wherein a chemical cellulose sample is steeped in an aqueous solution containing 17.5% by weight of sodium hydroxide prior to diluting the solution with water so that it contains 8.3% sodium hydroxide. The percentage of the cellulose remaining isoluble in the 8.3% sodium hydroxide, with corrections made for moisture in the chemical cellulose sample, is reported as alpha cellulose.

The cold alkali solubility of the chemical cellulose samples was determined by an adaptation of method CAA 8:55 of the Swedish Central Laboratory of the Cellulose Industry. In this method a sample of chemical cellulose is steeped for one hour at 20° C. in an aqueous solution containing 21.5% of sodium hydroxide based on the solution weight. The soluble cellulose fraction is then determined, with correction for moisture in the original chemical cellulose sample, by dichromate oxidation of an aliquot portion of the filtered steeping solution.

The viscose filtration values were determined by a procedure in general use throughout the viscose industry. In this procedure, a chemical cellulose sample is prepared by cutting 150 grams of sheeted cellulose into two inch square pieces. The chemical cellulose is added, piece by piece, in about three minutes to three liters of aqueous sodium hydroxide solution containing 18.5% by solution weight of sodium hydroxide and maintained at 65° C., while stirring the solution with a mixer. After slurrying for 15 minutes, the chemical cellulose is poured into a metal cylinder having a stainless steel screen bottom and a drain opening. A solid iron ram is placed in the cylinder so that a cake, 6" in diameter and 1¼ to 1½" thick, is obtained, which has a weight ratio of 2.7 times the original weight of the chemical cellulose. The resulting alkali cellulose cake is broken into pieces and passed one time through a motor-driven stainless steel picker. Two portions, each weighing 175 grams for duplicate determinations, of the fluffed alkali cellulose are weighed out and placed in two half-gallon jars for 21 hours of aging at 23° C. After aging, the alkali cellulose portions are transferred to stainless steel churns. Carbon disulfide is added in an amount sufficient to provide 34% carbon disulfide based on the weight of chemical cellulose in the alkali cellulose. The churns are sealed and placed on a machine to roll and tumble the contents for one hour at 35° C.

The resulting cellulose xanthate is then transferred to a stainless steel 2 liter beaker to be diluted and stirred to form an aqueous alkali solution of colloidal viscose. The beaker, approximately half full of solution containing 8.1% by weight of cellulose in 6% aqueous sodium hydroxide, is stirred by mechanical means for about two hours.

The viscose filterability is then measured by pouring about a liter of the colloidal viscose solution into a steel cylinder or barrel, sealing same and applying air pressure to force the viscose through a filter media of standard size and construction. The filtrate is measured either gravimetrically or volumetrically, and the time for completion of filtration as well as the amount filtered is recorded. The weight of viscose in grams required to plug or clog the filter is the filtration value.

The pentosan values set forth in the tables below were determined in the manner of Tappi method T223 ts–63 wherein the pentose sugars contained in the chemical cellulose sample are dehydrated with strong hydrochloric acid to form furfural while the hexose sugars react to form hydroxymethyl furfural. The furfural and hydroxymethyl furfural are then distilled from the chemical cellulose-acid slurry. The furfural and hydroxymethyl furfural content of an aliquot portion of the material collected is read by spectrophotometry at 277.5 m$\mu$. A standard correction for hydroxymethyl furfural is then made, based on the amounts of hydroxymethyl furfural previously determined in similar pulps, and the percentage pentosan in the chemical cellulose pulp sample is calculated.

The following examples illustrate the manner in which the invention can be practiced. It will be understood, however, that the invention is not confined to the specific limitations set forth in the individual examples but rather to the scope of the appended claims.

EXAMPLE I

Pine wood chips, are loaded into a digester, and an amount of a substantially chlorine free acidic aqueous solution of sodium chlorite weighing 5 times the weight of the bone dry wood chips is initially circulated and recirculated through the wood chip mass in the digester for 15 minutes at a temperature of about 70° F. The acidic aqueous solution has a pH of about 4, as adjusted by sulfuric acid addition. Acetic acid could be used to adjust the pH.

After circulation of the solution for the stated amount of time, which assures initial contact of the wood chips with the substantially chlorine free acidic aqueous solution of sodium chlorite, the acidic aqueous solution is drained from the digester. 0.5% by weight of sodium chlorite based on the bone dry weight of the wood chips and measured as available chlorine is retained by the wood chips and the drained solution is retained for later reuse in a subsequent oxidative prehydrolysis cycle with make-up chemical addition. After drainage, the digester is sealed and the impregnated wood chips are heated to prehydrolysis temperature by the introduction of live steam. A temperature of 340° F. is attained and held for 25 minutes. The accumulated condensate is removed from the vessel at the end of this treatment. After completion of the oxidative prehydrolysis, the chips are subjected to the above described standard sulfate digestion, whereupon the wood chips are blown from the digester, washed and screened according to procedures conventional in the industry. The screened pulp is then subjected to the above described bleaching treatment. After bleaching the chemical cellulose is dried for testing. In additional Examples II–V, pine wood chips are treated by the method of Example I with the exception that they are treated in oxidative prehydrolysis with the chemical, in the amounts measured as available chlorine on a bone dry wood chip weight basis, stated in Table I below, which table gives chemical analyses and viscose filtration performance for the resulting chemical celluloses. In Examples IV and V, the pine wood chips are treated by the method of Example I with the exception that an acidic aqueous solution of substantially chlorine free chlorine dioxide is used as the treating chemical. Table I also shows the results for a comparison cellulose pulp obtained by treating wood chips in the manner of Example I with the exception that only water, containing no substantially chlorine free chlorine dioxide or its chemical equivalent, was present during prehydrolysis.

TABLE I

| Example | Prehydrolysis chemical | Prehydrolysis chemical, percent on bone dry wood weight basis as available chlorine | Solution pH | Alpha cellulose, percent | Pentosan, percent | Cold alkali solubility, percent | Viscose filtration, grams | Multiple of increase over water prehydrolysis control |
|---|---|---|---|---|---|---|---|---|
| Control | Water | | | 95.0 | 2.7 | 3.9 | 297 | |
| I | Sodium chlorite | 0.5 | 4 | 96.1 | 2.3 | 2.9 | 530 | 1.78 |
| II | do | 2.0 | 4 | 96.5 | 2.0 | 2.4 | 515 | 1.73 |
| III | do | 5.0 | 4 | 96.5 | 2.1 | 2.5 | 830 | 2.80 |
| IV | Chlorine dioxide | 0.5 | 4 | 95.7 | 2.4 | 3.0 | 504 | 1.69 |
| V | do | 1.0 | 4 | 96.2 | 1.7 | 2.2 | 470 | 1.58 |

The results given in Table I clearly show that the chemical celluloses resulting from carrying out the procedures of Examples I–V are of higher purity than the control chemical cellulose prepared by water prehydrolysis in which the wood chips are subjected to the same prehydrolysis conditions with respect to time and temperature, but wherein no substantially chlorine free chlorine dioxide or its chemical equivalent is present during oxidative prehydrolysis. The alpha percentages of the chemical celluloses of Examples I–V are higher than those of the comparison sample prepared by steam-water prehydrolysis. The pentosan and cold 21.5% caustic solubilities of the chemical cellulose products of Examples I–V are lower than those of the comparison cellulose pulp; again demonstrating that the chemical cellulose products of Examples I–V are of markedly higher purity than their control sample. The viscose filtration results for the chemical cellulose products are especially demonstrative of the unexpected superiority of the chemical celluloses of this invention in that these viscose filtrations are about 1.6 to about 2.8 times the filtration values obtained for the comparison cellulose pulp. It is clearly shown that there has been a substantial increase and unexpected result in filterability in the chemical cellulose products of Examples I–V without addition of various surfactants in the conventional manner. The increase in filterability achieved is all the more significant when it is considered that filtration improvement with surfactants has been expensive and not entirely satisfactory due to the addition of extraneous chemicals to chemical cellulose which can produce undesirable effects during viscose processing.

When the oxidative prehydrolysis procedure of Example I is carried out with an amount of 6 pH substantially chlorine free acidic aqueous solution of sodium chlorite (pH adjusted with $H_2SO_4$) weighing 10 times the weight of the bone dry wood chips using a circulation and recirculation period of 70 minutes at a temperature of 180° F. prior to draining and retention of 15% chemical measured as stated in Example I, the resulting chemical cellulose has a somewhat increased purity and filtration value over that of Example I. The advantages of the invention are also achieved when the oxidative prehydrolysis procedure of Example I is carried out with a 2 pH acidic aqueous solution of sodium chlorite (pH adjusted with $H_2SO_4$) weighing 4 times the weight of the bone dry wood chips using a circulation and recirculation period of 10 minutes at a temperature of 60° F. prior to draining and retention of 0.2% chemical, measured as stated in Example I. Although applicants prefer to use the circulation and drainage procedure, the improved oxidative prehydrolysis can also be effected in the presence of the stated amounts of chemical and acidic aqueous solution. Similarly improved chemical cellulose products are also produced when magnesium chlorite is substituted for sodium chlorite in Example I and when potassium chlorite is substituted for chlorine dioxide in Example IV. The chemical cellulose products of Examples I–V and others prepared according to this invention are suitable and advantageous for use as raw materials in the preparation of viscose and various cellulose derivatives.

EXAMPLE VI

In order to demonstrate the effectiveness of the disclosed improved oxidative prehydrolysis over a prehydrolysis conducted in the presence of a mineral acid alone, pine chips are loaded into a digester with an amount of 2.5 pH acidic aqueous solution of substantially chlorine free chlorine dioxide gas (pH adjusted with $H_2SO_4$) weighing 6 times the weight of the bone dry wood chips. The acidic aqueous solution is circulated and recirculated through the wood chip mass in the digester for 15 minutes at a temperature of 70° F.

After circulation of the solution for the stated amount of time to insure contacting the wood chips with the acidic aqueous solution of substantially chlorine free chlorine dioxide, the solution is drained from the digester. 0.5% by weight of chlorine dioxide based on the bone dry weight of the wood chips and measured as available chlorine is retained by the wood chips. After drainage the digester is sealed and the impregnated wood chips are oxidatively prehydrolyzed by the introduction of live steam. A temperature of 340° F. is attained and held for 25 minutes. The accumulated condensate is then drained from the digester. After completion of the oxidative prehydrolysis, the wood chips are subjected to the above described sulfate digestion, whereupon the wood chips are blown from the digester, washed and screened according to conventional procedures in the industry.

The screened pulp is then given the above described bleaching treatment. After bleaching, the chemical cellulose is dried for testing and used as a cellulose derivative raw material. In addition Example VII, pine wood chips are treated by the method of Example VI with the exception that they are treated at 4 pH in prehydrolysis. Table II below gives the chemical analyses and filtration performance of the chemical cellulose products of Examples VI and VII. Table II also shows results for a comparison cellulose pulp obtained by treating wood chips in the manner of Example VI with the exception that only water, containing no substantially chlorine free chlorine dioxide or its chemical equivalent was present during prehydrolysis. In addition Table II gives results for a comparison sample prepared in the manner of Example VI but wherein a mineral acid, sulfuric acid, in sufficient amount to lower the pH to 3 was present during prehydrolysis without the presence of substantially chlorine free chlorine dioxide or a chemical equivalent thereof.

TABLE II

| Example | Prehydrolysis chemical | Prehydrolysis chemical, percent on bone dry wood weight basis as available chlorine | Solution pH | Alpha cellulose, percent | Pentosan, percent | Cold alkali solubility, percent | Viscose filtration, grams | Multiple of increase over sulfuric acid prehydrolysis control |
|---|---|---|---|---|---|---|---|---|
| Control | Water | | | 95.3 | 2.6 | 3.3 | 153 | |
| Do | Sulfuric acid | | 3 | 95.8 | 2.4 | 3.1 | 202 | |
| VI | Chlorine dioxide | 0.5 | 2.5 | 96.5 | 2.2 | 2.1 | 440 | 2.18 |
| VII | Chlorine dioxide | 0.5 | 4 | 96.5 | 2.1 | 2.5 | 605 | 2.99 |

The results given in Table II clearly show the superiority of the chemical celluloses produced by the procedures of Examples VI and VII over the comparison samples prepared in the same manner as Example VI but wherein water and water-sulfuric acid without substantially chlorine free chlorine dioxide are present during prehydrolysis. In particular the results given in Table II show that oxidative prehydrolysis according to the instant invention can produce chemical celluloses having a filtration value of about 2 to about 3 times that of a chemical cellulose produced with a mineral acid prehydrolysis. When hardwood chips are accorded the prehydrolysis treatments of Examples VI and VII, similar results to those obtained with softwood chips are achieved. The chemical cellulose products of Examples VI and VII are excellent raw materials for use in the production of viscose and cellulose derivatives.

While particular embodiments of the invention have been illustrated and described, it will be obvious to those skilled in the art that various changes and modifications can be made without departing from the spirit and scope of the invention. The appended claims are, therefore, intended to cover all such changes and modifications that are within the scope of this invention.

What is claimed as new is:

1. In the oxidative prehydrolysis of wood chips prior to sulfate digestion and subsequent bleaching steps to produce chemical cellulose, the process improvement which comprises carrying out the oxidative prehydrolysis at a temperature of about 300° F. to about 350° F. for a period of about 10 minutes to about 40 minutes while said wood chips are in initial wetting contact with about 4 to about 10 times the bone dry wood chip weight of a substantially chlorine free acidic aqueous solution having a pH of about 2 to about 6 and containing about 0.2% to about 15%, on a bone dry wood chip weight basis measured as available chlorine, of a chemical selected from the group consisting of chlorine dioxide, sodium chlorite, magnesium chlorite and potassium chlorite.

2. The improved oxidative prehydrolysis process of claim 1 wherein said wood chips are in initial wetting contact with about 5 times the bone dry wood chip weight of said acidic aqueous solution.

3. The improved oxidative prehydrolysis process of claim 1 wherein the wood chips are placed in initial wetting contact with said acidic aqueous solution by soaking the wood chips in about 4 to about 10 times their bone dry weight of a substantially chlorine free acidic aqueous solution containing a chemical selected from the group consisting of chlorine dioxide, sodium chlorite, magnesium chlorite and potassium chlorite for a period of about 10 to about 70 minutes at a temperature of about 60° F. to about 180° F. and thereafter draining excess acidic aqueous solution from the wood chips prior to oxidative prehydrolysis.

4. The improved oxidative prehydrolysis process of claim 1 wherein the wood chips are placed in initial wetting contact with said acidic aqueous solution by circulating and recirculating through the wood chips about 4 to about 10 times their bone dry weight of a substantially chlorine free acidic aqueous solution containing a chemical selected from the group consisting of chlorine dioxide, sodium chlorite, magnesium chlorite and potassium chlorite for a period of about 10 to about 70 minutes at a temperature of about 60° F. to about 180° F. and draining excess acidic aqueous solution from the wood chips prior to oxidative prehydrolysis.

5. The improved oxidative prehydrolysis process of claim 1 wherein said wood chips are in initial wetting contact with about 5 times the bone dry wood chip weight of a substantially chlorine free acidic aqueous solution having a pH of about 4 and containing about 1%, on a bone dry wood chip weight basis measured as available chlorine, of a chemical selected from said group.

6. The improved oxidative prehydrolysis process of claim 1 wherein said wood chips are in initial wetting contact with a substantially chlorine free acidic aqueous solution having a pH of about 4 and containing about 1%, on a bone dry wood chip weight basis measured as available chlorine, of a chemical selected from said group.

7. The improved oxidative prehydrolysis process of claim 1 wherein the wood chips are placed in initial wetting contact with said acidic aqueous solution by soaking the wood chips in about 5 times their bone dry weight of a substantially chlorine free acidic aqueous solution containing a chemical selected from the group consisting of chlorine dioxide, sodium chlorite, magnesium chlorite and potassium chlorite for a period of about 15 to about 20 minutes at a temperature of about 70° F. and thereafter draining excess acidic aqueous solution from the wood chips prior to axidative prehydrolysis.

8. The improved oxidative prehydrolysis process of claim 1 wherein the wood chips are placed in wetting contact with said acidic aqueous solution by circulating and recirculating through the wood chips about 5 times their bone dry weight of a substantially chlorine free acidic aqueous solution containing a chemical selected from the group consisting of chlorine dioxide, sodium chlorite, magnesium chlorite and potassium chlorite for a period of about 20 minutes at a temperature of about 70° F. and draining excess acidic aqueous solution from the wood chips prior to oxidative prehydrolysis.

References Cited

UNITED STATES PATENTS

| 1,053,125 | 2/1913 | Fair | 162—89 X |
| 2,799,580 | 7/1957 | Rys | 162—89 X |
| 2,878,118 | 3/1959 | Rogers | 162—82 |
| 3,013,933 | 12/1961 | Briggs | 162—68 |

HOWARD R. CAINE, Primary Examiner

U.S. Cl. X.R.

162—89